United States Patent

[11] 3,623,026

[72] Inventors William E. Engeler
Scotia;
Marvin Garfinkel, Schenectady, both of N.Y.
[21] Appl. No. 792,488
[22] Filed Jan. 21, 1969
[45] Patented Nov. 23, 1971
[73] Assignee General Electric Company

[54] MIS DEVICE AND METHOD FOR STORING INFORMATION AND PROVIDING AN OPTICAL READOUT
13 Claims, 10 Drawing Figs.

[52] U.S. Cl. .......... 340/173LS, 313/108 R, 317/235 N, 340/173 CR, 340/173 R
[51] Int. Cl. .......... G11c11/34, G11c 11/42, H01l 17/00
[50] Field of Search .......... 340/173, 173 LS; 317/235 N; 328/123, 124, 2; 315/8.5; 307/308, 311, 319; 259/84; 313/108

[56] References Cited

UNITED STATES PATENTS 3,267,317 8/1966 Fischer .......... 317/235 UX
3,424,934 1/1969 Berglund .......... 313/108
3,500,448 3/1970 Forlani .......... 317/235 X
3,543,032 11/1970 Kazan .......... 340/173 LS

OTHER REFERENCES

Morehead, Injection Mechanism & Recombination Kinetics in Electroluminescent Col. Te, 1966, Bull. Am. Phys. Soc., Vol. 11 No. 1, p. 35
Beam, Charge- Storage Beam- Addressable Memory, 10/66, IBM Tech. Dis. Bull., Vol. 9, No. 5, pp. 555- 556

*Primary Examiner*—Terrell W. Fears
*Assistant Examiner*—Stuart Hecker
*Attorneys*—Paul A. Frank, John F. Ahern, Frank L. Neuhauser, Oscar B. Waddell and Melvin M. Goldenberg

ABSTRACT: An information storing method and a storing device using a conductor-insulator-semiconductor (CIS) structure as a conductor storage element is disclosed within. The CIS structure is initially charged to predetermined voltage. Minority carriers are controllably generated within the semiconductor in proportional response to an information-bearing signal such as electromagnetic radiation flux. The generated minority carriers move to and are stored at the surface of the semiconductor beneath the conductor due to the electric field. The voltage is reversed, injecting the generated minority carriers into the semiconductor where they recombine with majority carriers. Electromagnetic radiation is produced during the recombination in an amount proportional to the integrated incident electromagnetic radiation flux.

Inventors:
William E. Engeler,
Marvin Garfinkel,
by John F. Ahern
Their Attorney.

Inventors:
William E. Engeler,
Marvin Garfinkel,
by John F. Ahern
Their Attorney.

MIS DEVICE AND METHOD FOR STORING INFORMATION AND PROVIDING AN OPTICAL READOUT

The present invention relates to methods and devices which store information for later optical readout. More particularly, the invention relates to methods and devices which sense and integrate electromagnetic radiation flux, store the integrated value, and are capable of optical readout. This application is related to our copending concurrently filed application Ser. No. 792,569 filed Jan. 21, 1969.

The importance of information storing devices and optical readout, both long term and transitory, is well known, particularly to those versed in the computer art. Particular attention is being directed to the image sensing and storing devices which are widely employed, for example, in optical readout computer systems. Devices employed in such systems as the above store the image momentarily and then, at a selected time, read out the stored information optically such as, for example, a reconstructed image.

Continued requirements for smaller, highly reliable sensing and storage devices have motivated researchers to develop solid state imaging devices. As a result of the steady growth of the semiconductor field, numerous variations in solid-state imaging devices have been developed.

Many of the devices, however, are limited to single spot imaging applications due to multiple photoconductive cross-talk paths between the various elements comprising the device. A further limitation is the inability of many imaging devices to operate in a "light integration" mode. That is, the device functions to provide an image only of what it "sees" at the instant the device is interrogated, thus precluding the device from acting even as a transitory storage device. The devices using PN photodiodes ordinarily require electron-beam scanning for "readout" (release) of the stored image. Attempts which have been made to overcome the above limitations have resulted in complex devices in opposition to the need for simple, reliable image sensing and storing devices.

It is one object of the present invention to provide for a method of integrating and storing information in a solid-state device.

Another important object is to provide for a simple and flexible image sensing and storing device operable in a light integration mode and capable of optical readout.

Briefly, the method of our present invention utilizes a conductor-insulator-semiconductor structure as a capacitor to store information. The CIS structure is charged to a predetermined voltage which influences the band structure of the semiconductor at its surface, thereby creating a depletion region in the semiconductor below the conductor. The ability of the semiconductor medium to generate minority carriers to restricted, preserving the nonequilibrium state initiated by the step of charging. The step of storing information is attained by generating minority carriers within the semiconductor in controlled response to incoming information which may be in the form of electromagnetic radiation having an energy at least as great as the semiconductor bandgap and incident upon the CIS structure. The number of minority carriers generated is proportional to the amount of integrated electromagnetic radiation flux. The electric field within the depletion region causes the generated minority carriers to be driven to and stored at the surface of the semiconductor beneath the conductor with little loss. The voltage is then reversed, thereby changing the direction of the electric field and injecting the stored minority carriers into the semiconductor bulk. Electromagnetic radiation is emitted in an amount which is proportional to the number of minority carriers generated and stored and, therefore, proportional to the integrated incident electromagnetic radiation flux.

A CIS device in one embodiment of our present invention comprises a semiconductor material which is restricted in its ability to produce minority carriers through tunnelling and thermal generation. In this embodiment, a conductor material and an insulator are employed which are substantially transparent to electromagnetic radiation having bandgap energies. A thin layer of the insulating material separates the conductor and semiconductor. When the CIS structure is charged to the predetermined voltage and is exposed to radiation of bandgap energies passing through the substantially transparent conductor and insulator layers, minority carriers generated within the semiconductor bulk near or in the depletion region move to the insulator-semiconductor interface. Reversing the voltage changes the direction of the electric field, thereby injecting the minority carriers into the semiconductor and causing emission of electromagnetic radiation. The amount of the emitted radiation is as stated before proportional to the integrated flux of the bandgap electromagnetic radiation.

The novel features believed characteristic of the present invention are set forth in the appended claims. The invention itself, together with further objects and advantages thereof, may be best understood by reference to the following detailed description taken in connection with the appended drawings in which:

FIG. 1 illustrates in cross section a conductor-insulator-semiconductor device in accord with one embodiment of our present invention.

FIG. 2*a* to 2*e* illustrate the band structure of a conductor-insulator-semiconductor sequentially operated in accord with our present invention.

It has recently been found that conductor-insulator-semiconductor devices (CIS) devices may be utilized as capacitors to inject minority carriers into the bulk of the semiconductor, thereby eliminating when desired the need for a PN junction or an injecting contact. For example, when the semiconductor medium is of the P-type and the metal or conductor plate is biased strongly positive with respect to the semiconductor, the band structure of the semiconductor is influenced, forming a depletion region in the semiconductor region beneath the conductor. Minority carriers begin to accumulate at the insulator-semiconductor interface due to quantum mechanical tunnelling (when the doping concentration of ionized impurity centers is large and the electric field is strong). When the voltage is reversed, the electric field in the semiconductor also being reversed drives the minority carriers into the bulk of the semiconductor. When employing a semiconductor material such as GaAs a III–V compound having a "direct energy gap," electroluminescence may be observed due to the radiation emitted during the ensuing recombination process. Generally, semiconductor material having a direct energy gap may be defined as a material which permits minority carrier recombination without the necessity for generation or absorption of a phonon during the recombination process.

We have discovered that through the proper selection of a semiconductor material employed in a CIS capacitor (and operation thereof) that we are able to controllably generate minority carriers within the semiconductor material and, therefore, utilize the CIS capacitor as a device for storing information and optically reading out the stored information.

Figure 1:
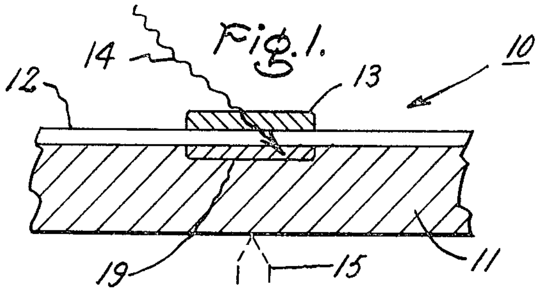

FIG. 1 illustrates the construction of an example of one CIS device 10 which may be utilized as above. In FIG. 1, a substrate 11 of P-type semiconductor material has an insulator layer 12 formed thereon. A conductor plate 13 is deposited on the insulator layer 12. An electromagnetic radiation ray 14 is shown penetrating conductor plate 13 and insulating layer 12. As illustrated by the broken lines, contact 15 is shown contacting substrate 11. Both radiation ray 14 and injecting contact 15 illustrate different techniques by which minority carriers may be provided. Though injecting contact 15 is disclosed as a point contact, a PN junction contact may be employed when desired.

Figure 2A:
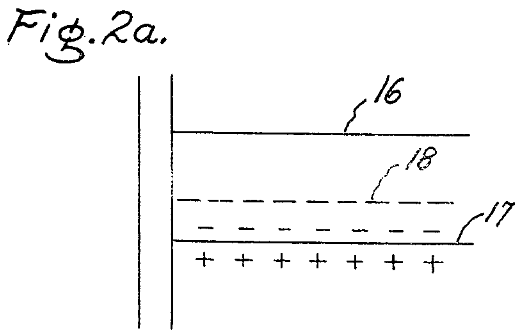

FIG. 2*a* represents the band structure of a CIS device before the conductor is biased. Lines 16 and 17 indicate, respectively, the band edges of the conduction and valence bands. Line 18 indicates the semiconductor Fermi level which is nearer the valance band because the semiconductor material employed herein for descriptive purposes is P-type. As is evident, the resultant electric field near the semiconductor-insulator interface is zero.

Figure 2B:
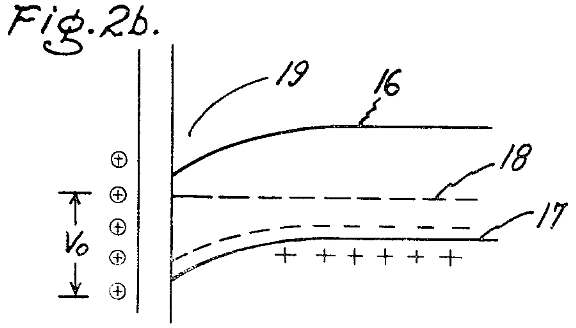

When a voltage $V_0$ is supplied, giving conductor plate 13 a positive bias, as shown in FIG. 2*b*, a depletion region 19 forms in substrate 11 beneath conductor plate 13. Initially, all the charge required by the external charging voltage is supplied by ionized impurity centers in a region (depletion region 19) near the surface which has been depleted of majority carriers (electropositive holes).

Figure 2C:
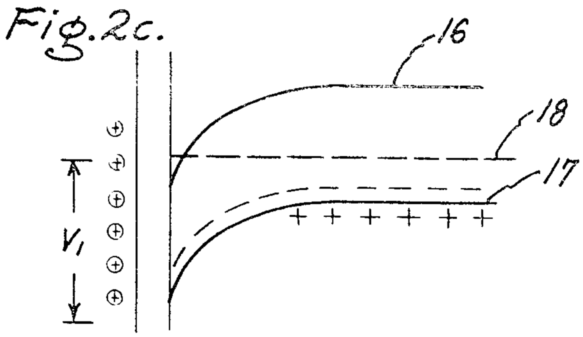

When there are no minority carriers present, depletion region 19 continues to extend into the bulk of the semiconductor as the biasing voltage is increased even after the band edge 16 moves below the Fermi level 18. This is illustrated by FIG. 2*c* where the biasing voltage is $V_1$.

The surface of the semiconductor beneath conduction plate 13 is now in a nonequilibrium state. The width of depletion region 19 varies inversely with the 1/2 power of the concentration of impurity centers. The minority carriers which may be generated within or near the depletion region are swept to the semiconductor surface by the electric field within the depletion region. Generally, the source of minority carriers is the equilibrium number which exists in the semiconductor due to normal thermal generation-recombination processes. For example, the generation of minority carriers at room temperature in cadmium sulfide is on the order of $10^6$ carriers/cm.$^3$-sec. We have found that by making depletion region 19 sufficiently short, the rate of minority carrier arrival at the surface of semiconductor substrate 11 is reduced to a nominal rate. Again using CdS as an example and noting that approximately $10^{12}$ charges per cm.$^2$ are needed to invert the semiconductor, we have found that an interval of time on the order of $10^{10}$ seconds is required before equilibrium through bulk thermal generation may be reached with the depletion region depth is approximately $10^{-4}$ cm. By choosing the proper concentration of impurity centers, an effective depletion depth may be obtained which precludes a significant rate of arrival of thermally generated minority carriers at the surface of semiconductor substrate 11. When employing a semiconductor such as InSb having a more narrow band gap, thermal generation of carriers at room temperature is excessive, even for the smallest depletion depths. Devices fabricated utilizing such semiconductor materials must be cooled below room temperature for proper operation.

With sufficiently high concentration of impurity centers very narrow depletion lengths are obtained. In this case, the electric fields within the depletion region are sufficiently high so that minority carriers may reach the surface of semiconductor 11 beneath conductor plate 13 by quantum mechanical tunnelling. For example, in FIG. 2*c*, electrons may tunnel from valence band 17 through the forbidden energy gap in the narrow depleted region to conduction band 16 in the inverted surface regions. By choosing a concentration below a level, which varies for different semiconductor materials, the effect of tunneling may be rendered small. This level of concentration varies with the type of semiconductor material chosen. Using CdS, for example, we have found that an impurity center concentration of $10^{17}$/cm.$^3$ is sufficiently small to limit such tunnelling.

In general, the necessary impurity concentration varies with the type of semiconductor which is selected. Depletion depths which are smaller than several hundred Angstrom units should be avoided, thereby setting an approximate lower limit on depletion depths.

It is also important that no other source of minority carriers be present. The semiconductor region beneath conduction plate 13 must not be in electrical contact with a region of opposite conductivity type such as a diffused N-type region when the semiconductor is P-type. Furthermore it is important that the surface portions of the semiconductor extending laterally from the capacitor device (as seen in FIG. 1) be not inverted. Generally, this is accomplished by preventing the incorporation of a net positive charge within the insulator layer. Surface thermal generation of minority carriers is also reduced by maintaining the surface potential well below the inverted potential.

Because, as shown above, the ability of the semiconductor substrate 11 to produce minority carriers is substantially reduced or restricted, a means has now been provided by which information may be stored. More explicitly in reference to FIG. 2*d*, minority carriers may be controllably generated or introduced externally, as by electromagnetic radiation, as shown by electromagnetic radiation ray 14. Electromagnetic radiation having wavelengths shorter than that corresponding in energy to the width of the semiconductor bandgap will be absorbed by the semiconductor. Electron hole pairs such as pair 20 are then generated. When the minority carrier is formed in or near the depletion region, it is swept to the surface of substrate 11 and stored there. Thus, the number of minority carriers which reach the surface is proportional to the integrated electromagnetic flux incident upon substrate 11 after conductor plate 13 was charged.

Figure 2D:
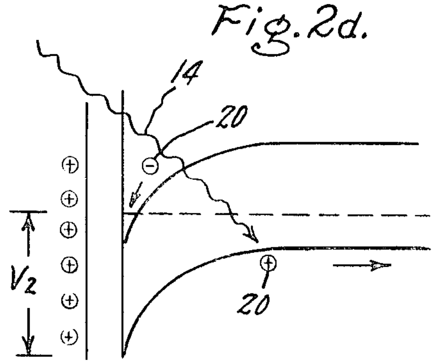
Figure 2E:
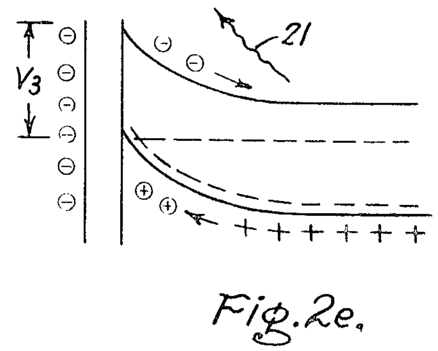

FIG. 2*e* is the final state of the operative sequence in which the bias on conductor layer 13 is reversed. The direction of the electric field is reversed thus driving or injecting the accumulated minority carriers into the semiconductor substrate. The minority carriers recombine with the majority carriers and a burst of electromagnetic radiation 21 is emitted during the recombination process. The emitted radiation 21 has an intensity proportional to the integrated electromagnetic input. The, CIS reads out the information stored within the readout being an indication or measurement of the integrated amount of flux incident on the semiconductor. As stated hereinbefore, it is important in the attainment of high efficiencies that the semiconductor be a direct bandgap semiconductor, such as, for example, GaAs, InSb, CdS, CdTe, and $GaAs_x P_{(1-x)}$ for $x>0.7$. When high efficiencies, however, are not necessary a semiconductor material such as gallium phosphide may be employed.

FIGS. 2*a*–2*e*, particularly FIG. 2*d*, illustrate but one technique by which minority carriers may be provided. Fig. 1, as stated previously, also illustrates the use of an injecting contact 15 which may either be a point or PN junction contact to provide the carriers. The contact may be utilized to inject a desired number of minority carriers for storage purposes. The amount of electromagnetic radiation emitted after conductor plate 13 is reverse biased is a measure of the number of minority carriers injected into the semiconductor and stored at the surface beneath the conductor and, therefore, constitutes an optical readout of stored information.

FIGS. 1 and 2 also illustrate that the incident electromagnetic radiation passes through conductor plate 13 and insulating layer 12. Such a mode of penetration allows substrate 11 to be fabricated with any desired thickness, thus rendering the manufacture of the CIS devices more convenient. The conducting plate 13 may be a deposited metal plate such as molybdenum, for example, having a thickness of approximately 200 A.U., which is partly transparent to visible and longer wavelength radiation. The choice of material, however, depends primarily upon the wavelength of the selected incident light and the sensitivity of the semiconductor. It also should be understood that conducting media other than metal layers such, for example, as a layer of tin oxide may be utilized for conducting plat 13.

The insulating layer 12 is chosen for reasons substantially set forth as above but may conveniently be $SiO_2$ with a thickness of approximately 1,000 A.U.

Under other circumstances, it may be desirable to have the incident electromagnetic radiation penetrate into the semiconductor substrate through the major surface located on the side opposite the CIS structure. The substrate is then necessarily limited in thickness because the electron hole pairs must be formed sufficiently close to the depletion region so as to allow the minority carriers to reach the surface above the depletion region. It follows that when this is done, it is not necessary to have transparent conductors and insulators. For example, a layer of molybdenum 5,000 A.U. thick may be utilized for the conductor.

As is readily evident, the particular semiconductor utilized largely determines the wavelength and the amount of emitted electromagnetic radiation. For example, at 77° K., the peak emission radiation of Cds a II–VI compound, has a wavelength of approximately 4,950 A. Which is commensurate with the bandgap energy. By utilizing other II–VI compounds such as CdSe which have high efficiency for the production of light, different emission wavelengths may be obtained. Still different wavelengths are obtainable by using III–V compounds such as GaAs or InSb, for example.

By the selection of different types of impurities and the introduction thereof into the semiconductor, emitted electromagnetic radiation having photon energy other than bandgap energies may be produced. Briefly, the ionized impurity centers in varying degrees and depending largely on the charge characteristic of the center participate in the recombination process. Thus a copper impurity may be utilized, for example, in II–VI compounds which provides radiation having wavelengths different from the same compounds employing silver as the impurity.

FIGS. 2*a* –2*e* show semiconductor substrate 11 as a P-type semiconductor. Alternatively, it may be preferable to employ an N-type semiconductor. The conductor plate 13 is then biased negatively and the minority carriers supplied to the semiconductor are electropositive holes. After an appropriate time interval, the conductor is reverse biased and the recombination process with concurrent emission occurs as before.

Figure 3:
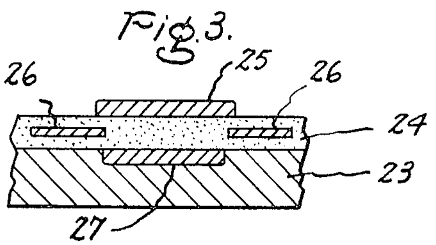
FIG. 3 illustrates a vertical cross-sectional view of another embodiment of our present invention.

FIG. 3 illustrates, in vertical cross section, another embodiment of our present invention wherein an auxiliary capacitor plate within the insulating layer restricts the formation of the inverted region to selected regions of the semiconductor substrate when the conductor plate is biased.

As illustrated, a semiconductor substrate 23 has one major surface covered by an insulating layer 24. Conductor plate 25 covers a portion of the surface of insulating layer 24. Both insulating layer 24 and conductor plate 25 are substantially transparent to electromagnetic radiation, commensurate with the bandgap energies of the semiconductor substrate 23. An auxiliary capacitor 26 which may be, for example, annular in configuration is positioned parallel to the major surface of semiconductor substrate 23 within the insulating layer 24. It should be understood, however, the other configurations may be utilized when desired.

In operation auxiliary capacitor 26 is maintained at a fixed potential so that when conductor plate 25 is biased, a depletion region 27 is formed within a surface region of semiconductor substrate 25 which is beneath conductor plate 25 and in substantial registry with the boundaries as defined by the inner diameter of auxiliary capacitor 26. The auxiliary capacitor, therefore, functions to delineate precisely the inverted region and to otherwise prevent unwanted lateral extension of the inverted regions into adjacent surface regions of semiconductor substrate 23. For reduced voltage operation, insulating layer 24 may be reduced in thickness within substantially that region bounded by the inward facing edges of auxiliary capacitor 26.

Figure 4:
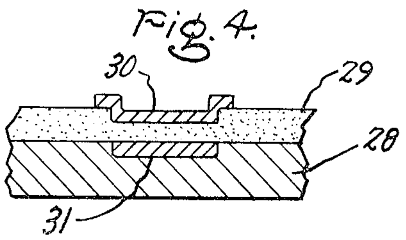
FIG. 4 illustrates, in a vertical cross-sectional view, another embodiment of our present invention.

FIG. 4 illustrates, in vertical cross section, still another embodiment of our present invention which restricts the inverted region to a selected region within a semiconductor substrate. As in the embodiment of FIG. 3, an insulating layer 29 covers one major surface of a semiconductor substrate 28. A portion of insulating layer 29 is etched or otherwise removed, leaving a region of reduced thickness surrounded by a region of greater thickness. A conductor plate 30 covers the surface of the reduced thickness region of insulating layer 29 and overlaps onto the surface of the surrounding greater thickness region.

As in the embodiment of FIG. 3, both insulating layer 29 and conductor plate 30 are substantially transparent to electromagnetic radiation which is comparable in energy to the bandgap energies of the semiconductor substrate 28.

When conductor plate 30 is biased, an inverted region 31 forms within semiconductor substrate 28 beneath conductor plate 30 in substantial registry with the area defined by the reduced thickness region of insulating layer 29. The regions extending laterally outward from the inverted region are not substantially affected because the greater thickness of insulating layer 29 results in smaller electric field between the overlying extension of conductor plate 30 and the underlying portion of semiconductor substrate 28. The necessary thickness of insulating layer 29 depends largely upon the magnitude of the electric field across insulating layer 29. This configuration of insulating layer 29, therefore, functions to delineate the inverted region and otherwise prevents unwanted lateral extension of inverted region 31 into the adjacent surface region of semiconductor substrate 23.

Figure 5:
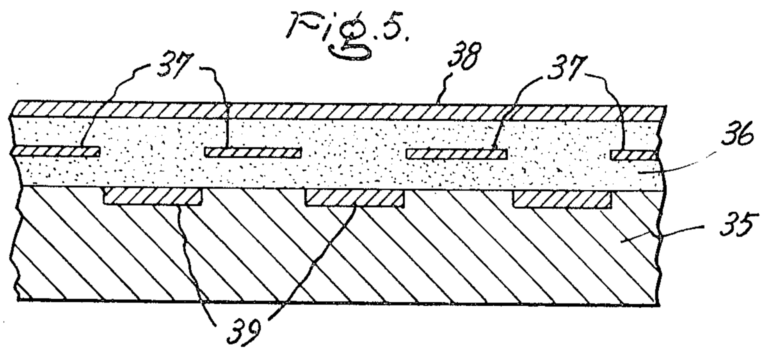
FIG. 5 illustrates a vertical cross-sectional view of yet another embodiment of our present invention.

FIG. 5 is a vertical cross-sectional view of another embodiment of our present invention wherein, for example, an optical image incident thereon may be stored and then released at a later time. In FIG. 5, a semiconductor substrate 35 has one surface thereof covered by an insulating layer 36. A plurality of densely packed auxiliary capacitor plated 37 are positioned within the insulating layer 36. A conducting layer 38 covers the insulating layer. As before, both insulating layer 36 and conducting layer 38 may be substantially transparent to electromagnetic radiation having energy comparable to the bandgap energies of the semiconductor substrate 35. Conveniently, plates 37 may be formed and interconnected by aperturing a single film.

Auxiliary capacitor plates 37 are maintained at a fixed potential so that when the conductor layer 38 is biased, depletion regions 39 are formed at the surface portions of the semiconductor substrate 35 laterally removed from surface portions beneath the auxiliary capacitor plates 37. Thus, auxiliary capacitor plates 37 perform the functions of preventing unwanted surface inversion to occur at the surface portions of semiconductor substrate beneath the auxiliary capacitor plates 37 and also effectively dividing the storage device into a plurality of discrete CIS capacitors within the apertures determined by the conductor layer 37.

When the conducting layer 38 is reverse biased as before, the stored minority carriers generated, for example, by incident electromagnetic radiation on the semiconductor substrate 35 are swept into the bulk of the semiconductor substrate 35 and recombine with the carriers of opposite charge. The electromagnetic radiation emitted during the recombination process and being in an amount in proportion to the integrated incident light flux reforms the composite image that was incident upon the storage device.

The auxiliary capacitor plates 37 may be arranged in any desired pattern to define the CIS elements. The density of the CIS elements depending in part upon the positioning of the auxiliary capacitor plates may be on the order of approximately $10^6/cm^2$.

Figure 6:
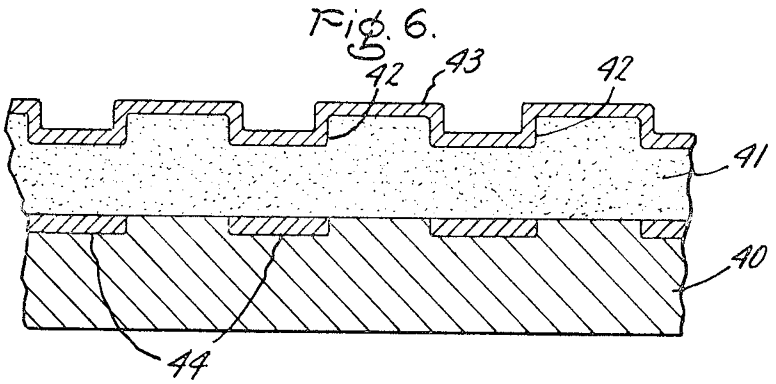
FIG. 6 illustrates a vertical cross-sectional view of still another embodiment of our present invention.

Fig. 6 illustrates, in vertical cross section, still another embodiment of our present invention wherein, for example, an optical image incident thereon may be stored and then released at a later time. As before, a semiconductor substrate 40 has one surface thereof covered by an insulator layer 41 having a pattern of depressions 42 which in turn is covered by a conductor layer.

In the embodiments detailed herein, the semiconductor may be employed as a base. Alternatively, however, a substrate made of any appropriate material such as glass may be employed to form a base for the semiconductor material.

The pattern of depressions 42 is formed in the insulator layer 41 so as to provide insulator layer 41 with a narrow thickness along the bottom of the depressions 42 and to make the top and bottom surfaces thereof substantially parallel. The pattern of depressions 42 may be conveniently arranged in an X–Y pattern or any desired configuration. A conductor layer 43, such as a metallic film, of substantially uniform thickness is formed over the insulator layer 41 thereby creating a multiplicity of discrete CIS devices at the coordinates of the depressions 42 having conductor layer 43 in common. When conductor layer 43 is charged to a predetermined voltage, each CIS capacitor has a depletion region layer 44 formed in the semiconductor substrate beneath each depression 42. Because of thickness of the insulator layer 41 over the laterally adjacent regions of the semiconductor substrate 40, no inversion layer is formed therein. The dimensions chosen for the thickness of the insulating layer 41 depend in a large part upon the strength of the electric field needed to sweep the minority carriers to the surface of the semiconductor substrate 40. For example, when cadmium sulfide is employed a thickness of 1,000 A. is sufficient. By utilizing electromagnetic radiation, as for example, in the form of an optical image, or some other means for controllably generating minority carriers within the semiconductor substrate 40 near the depletion regions 44, the entire array of CIS capacitors may be utilized simultaneously for storing information. In the case of incident electromagnetic radiation and when the polarity of the conductor layer 43 is reversed, each CIS capacitor emits electromagnetic radiation in an amount proportional to the integrated electromagnetic radiation flux incident thereon.

Alternatively, both the embodiments of FIGS 5 and 6 may be utilized to form alphanumerical figures by introducing minority carriers to selected CIS elements of the arrays by either incident radiation or by minority carrier injection through, for example, PN or point contacts. In this case, it would be necessary to to provide for substantially transparent conducting and insulating layers, except on the viewing side.

As is apparent in view of the foregoing, we have disclosed several embodiments in which a conductor-insulator-semiconductor device is utilized initially to store information in the form of controllably generated minority carriers stored at the semiconductor insulator interfaces and then to optically read out the stored information as electromagnetic radiation. Further detailed herein was an array of CIS devices which may be employed in great advantage as an optical readout screen for a computer system and the like. The individual CIS devices may be utilized to integrate electromagnetic radiation when exposed thereto and to emit electromagnetic radiation with an intensity proportional to the integrated incident electromagnetic radiation flux.

While the invention has been disclosed with respect to certain specific embodiments thereof, many modifications and changes will readily occur to those skilled in the art. Accordingly, we intend by the appended claims to cover all such modifications and changes as fall within the true spirit and scope of the present invention.

What we claim as new and desire to secure by Letters patent of the United States is:

1. An information storage and optical readout device comprising:
- a semiconductor material of one conductivity type;
- an insulator layer deposited on the one surface of said semiconductor material;
- a conductor plate deposited on said insulator layer;
- means for biasing said conductor plate relative to said semiconductor to cause formation of a depletion region and an electric field within said semiconductor material beneath said conductor plate, said semiconductor material having a concentration of impurity centers below a level permitting substantial tunneling of minority carriers to said one surface beneath said conductor plate;
- PN-junction means for generating within said semiconductor material minority carriers which are swept to and stored at said surface of said semiconductor material beneath said conductor plate by the electric field within the depletion region; and
- means for reverse biasing said conductor plate to cause said semiconductor material to emit electromagnetic radiation in an amount proportional to the number of minority carriers stored at said surface of said semiconductor material beneath said conductor plate.

2. The device of claim 1 wherein said semiconductor material is selected from a group consisting of direct bandgap semiconductor material.

3. The device of claim 1 wherein said semiconductor material is selected from a group consisting of cadmium sulfide, cadmium selenide, and cadmium telluride.

4. The device of claim 1 wherein said conductor and insulator layers are substantially transparent to electromagnetic radiation of photon energies at least as great as the bandgap of said semiconductor material 5. A method for storing information in a conductor-insulator-semiconductor device and for producing an optical readout of the stored information comprising the steps of:
- biasing the conductor relative to the semiconductor so as to provide a depletion region within the semiconductor beneath the conductor;
- controllably providing the semiconductor with minority carriers for a predetermined time interval by irradiating the semiconductor portion of the device with selected electromagnetic radiation having an energy at least as great as the bandgap energy of the semiconductor portion, which minority carriers move to and are stored at the semiconductor surface beneath the conductor, said semiconductor having a concentration of impurity centers below a level permitting substantial tunneling of minority carriers to said surface beneath said conductor; and
- reversing the bias on the conductor so as to inject the stored minority carriers into the semiconductor and to cause emission of electromagnetic radiation with an intensity proportional to the number of minority carriers stored at the semiconductor surface.

6. A method for storing information in a conductor-insulator-semiconductor device and for producing an optical readout of the stored information comprising the steps of:
- biasing the conductor relative to the semiconductor so as to provide a depletion region within the semiconductor beneath the conductor;
- selectively injecting minority carriers into the semiconductor portion with a PN-junction contacting the semiconductor portion, which minority carriers move to and are stored at the surface beneath the conductor; and
- reversing the bias on the conductor so as to inject the stored minority carriers into the semiconductor and to cause emission of electromagnetic radiation with an intensity proportional to the number of minority carriers stored at the semiconductor surface.

7. An information storage and optical readout device comprising:
- semiconductor material of one conductivity type;
- an insulator layer deposited on one surface of said semiconductor material and having a region of narrow thickness surrounded by a region of greater thickness;
- a conductor plate deposited on said region of narrow thickness insulator layer and adapted to be biased to cause formation of a depletion region thereunder and an electric field within said semiconductor material beneath said conductor plate, said semiconductor material having a concentration of impurity centers below a level permitting substantial tunneling of minority carriers to said one surface beneath said conductor plate;
- said region of greater thickness having a thickness sufficient to prevent the formation of a depletion region within said semiconductor material beneath said region of greater thickness when said conductor plate is biased;
- means for generating within said semiconductor material minority carriers which are swept to and stored at said surface of said semiconductor material beneath said conductor plate by the electric field within the depletion region; and means for reverse biasing said conductor plate to cause said semiconductor material to emit electromagnetic radiation in an amount proportional to the number of minority carriers stored at said surface of said semiconductor material beneath said conductor plate.

8. An information storage and optical readout device comprising:

semiconductor material of one conductivity type;

an insulator layer deposited on one surface of said semiconductor material;

a conductor plate deposited on said insulator layer and adapted to be biased to cause formation of a depletion region and an electric field within said semiconductor material beneath said conductor plate wherein said semiconductor material has a concentration of impurity centers below a level permitting substantial tunneling of minority carriers to said one surface beneath said conductor plate;

a capacitor plate positioned within said insulating layer and adapted to be maintained at a fixed potential, said capacitor plate preventing the formation of a depletion region within said semiconductor material beneath said capacitor plate when said conductor plate is biased;

means for generating within said semiconductor material minority carriers which are swept to and stored at said surface of said semiconductor material beneath said conductor plate by the electric field within the depletion region; and means for reverse biasing said conductor plate to cause said semiconductor material to emit electromagnetic radiation in an amount proportional to the number of minority carriers stored at said surface of said conductor plate.

9. The device of claim 8 wherein said capacitor plate is an annular capacitor plate, said conductor plate deposited on the surface of said insulating layer above said annular capacitor plate wherein a depletion region forms within said semiconductor material substantially in registry with the inner diameter of said annular capacitor plate when said conductor plate is biased.

10. A storage and optical readout apparatus comprising:

a plurality of storage devices spaced apart from one another and arranged in a predetermined pattern, each of said storage devices comprising a semiconductor material separated from a conductor plate by a narrow thickness of insulator material;

means for biasing said conductor plates relative to said semiconductor material to cause a depletion region and an electric field to form in said semiconductor material said semiconductor material having a concentration of impurity centers below a level permitting substantial tunneling of minority carriers to the surface of said semiconductor material beneath said conductor plate;

means for irradiating the semiconductor material with electromagnetic radiation for a predetermined time interval to cause the generation of minority carriers within said semiconductor material of each of said storage devices which minority carriers are swept to and stored at said surface of said semiconductor material beneath said conductor plate by the electric field within the depletion region; and means for reverse biasing said conductor plates to cause said semiconductor material of each of said storage devices to emit electromagnetic radiation in an amount proportional to the number of minority carriers which are swept to and stored at said surface of said semiconductor material within each storage device.

11. A storage and optical readout apparatus comprising;

a plurality of storage devices spaced apart from one another and arranged in a predetermined pattern, each of said storage devices comprising a semiconductor material separated from a conductor plate by a narrow thickness of insulator material said narrow thickness portion of an insulator layer on one surface of the semiconductor material and wherein said conductor plate of each storage device comprises a portion of a conductor layer of substantially uniform thickness on said insulator layer; said narrow thickness portions of said insulator layer being spaced apart from one another by portion of said insulator layer having a greater thickness causing depletion regions to be formed in said semiconductor material only beneath said narrow thickness portions of said insulator layer when said conductor layer is biased;

means for biasing said conductor plates relative to said semiconductor material to cause a depletion region and an electric field to form in said semiconductor material said semiconductor material having a concentration of impurity centers below a level permitting substantial tunneling of minority carriers to the surface of said semiconductor material beneath said conductor plate;

means for generating minority carriers within said semiconductor material of each of said storage devices which are swept to and stored at said surface of said semiconductor material beneath said conductor plate by the electric field within the depletion region; and means for reverse biasing said conductor plates to cause said semiconductor material of each of said storage devices to emit electromagnetic radiation in an amount proportional to the number of minority carriers which are swept to and stored at said surface of said semiconductor material within each storage device.

12. A storage and optical readout apparatus comprising:

a plurality of storage devices spaced apart from one another and arranged in a predetermined pattern, each of said storage devices comprising a semiconductor material separated from a conductor plate by a narrow thickness of insulator material, said insulator material of each storage device comprising a preselected portion of an insulator layer of substantially uniform thickness on one surface of said semiconductor material and wherein the conductor plate of each storage device comprises a preselected portion of conductor layer of substantially uniform thickness on said insulator layer;

said insulator layer having a plurality of capacitor plates positioned therein substantially parallel to said surface of said semiconductor material and extending laterally between said preselected portions of said insulator layer, said capacitor plates adapted to be maintained at a fixed potential causing a depletion region to be formed in said semiconductor material only beneath said preselected portions of said insulated layer, said capacitor plates adapted to be maintained at a fixed potential causing a depletion region to be formed in said semiconductor material only beneath said preselected portions of said insulated layer when said conductor layer is biased;

means for biasing said conductor plates relative to said semiconductor material to cause a depletion region and an electric field to form in said semiconductor material said semiconductor material having a concentration of impurity centers below a level permitting substantial tunneling of minority carriers to the surface of said semiconductor material beneath said conductor plate;

means for generating minority carriers within said semiconductor material of each of said storage devices which are swept to and stored at said surface of said semiconductor material beneath said conductor plate by the electric field within the depletion region; and means for reverse biasing said conductor plates to cause said semiconductor material of each of said storage devices to emit electromagnetic radiation in an amount proportional to the number of minority carriers which are swept to and stored at said surface of said semiconductor material within each storage device.

13. A conductor-insulator-semiconductor structure for information storage comprising:

a semiconductor substrate of one conductivity type;

an insulator layer on one surface of said substrate;

said semiconductor having a concentration of impurity centers sufficiently low to prevent substantial tunneling of minority carriers to said surface of said substrate;

means for biasing said conductor plate relative to said substrate to form a minority carrier storage region in the surface-adjacent portion of said substrate underlying said conductor plate;

PN-junction means connected to said semiconductor substrate for controllably providing said semiconductor substrate with minority carriers for storage in said storage region; and means for reverse biasing said conductor plate to inject the stored minority carriers into the semiconductor substrate and cause emission of electromagnetic radiation with an intensity proportional to the number of minority carriers stored in said storage region.

* * * * *